Figure 1:
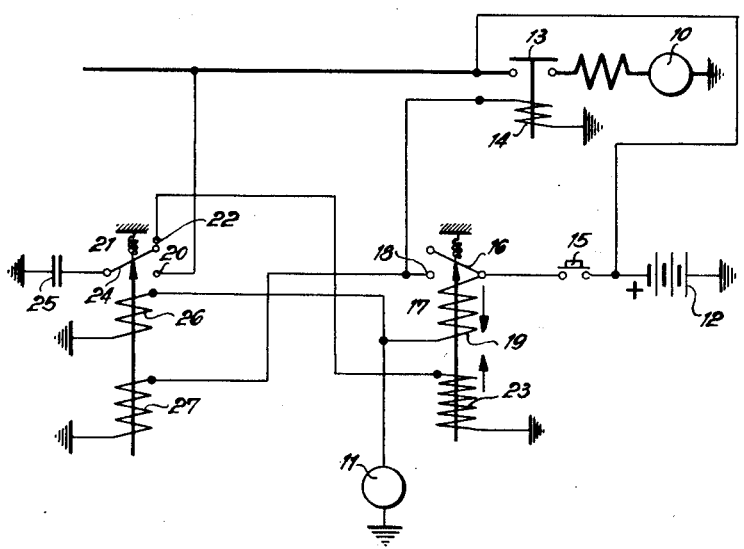

Jan. 11, 1955  E. SCHNARZ  2,699,507
ELECTRICAL CONTROL DEVICE FOR STARTING MOTOR SYSTEMS
Filed May 4, 1953

INVENTOR
Ernst Schnarz
by
Sterling, Davis, Miller & Mosher
his attorneys

United States Patent Office 2,699,507
Patented Jan. 11, 1955

2,699,507
ELECTRICAL CONTROL DEVICE FOR STARTING MOTOR SYSTEMS

Ernst Schnarz, Gerlingen, Germany, assignor to Robert Bosch G. m. b. H., Stuttgart, Germany Application May 4, 1953, Serial No. 352,724

Claims priority, application Germany May 9, 1952

6 Claims. (Cl. 290—36)

The present invention relates to an electrical control device for application to the starting motor systems of internal combustion engines on motor vehicles or the like which are equipped with a battery, a generator driven by the internal combustion engine, an electromagnetic starting switch for the starting motor and a control relay for the starting switch, as also a hand switch for actuating the switching device of the said control.

The object of this invention is to ensure that the starting motor is prevented from being switched on whilst the internal combustion engine is still turning, and especially also when oscillating before stopping.

In the case of a known control device, the starting switch is controlled by a relay whose exciting winding is disposed between the battery and the generator driven by the combustion engine and may, therefore, be fed from the battery when the generator has stopped, but becomes inactive owing to the counter voltage of the working generator. Whilst the combustion engine is running or the generator is driven thereby, actuation of the starting switch is thus not possible. This device becomes however ineffective, in the latter part of the slowing down of the engine, particularly when the engine is oscillating after being switched off, because in this case the counter voltage of the generator drops practically to zero, and therefore excitation of the control relay by the battery is again possible.

In order to avoid this disadvantage, the control relay is provided, in accordance with this invention, apart from with its normal actuating winding, also with an additional winding through which a condenser is automatically discharged after the internal combustion engine is switched off, in which, by a corresponding arrangement and proportioning of the extra winding, the field produced therein by the condenser current is of a value relatively to the field of the normal actuating winding such that the relay remains open until the internal combustion engine completely stops.

Two forms of construction of the invention are illustrated in the accompanying diagrams, by way of example.

Figure 2:
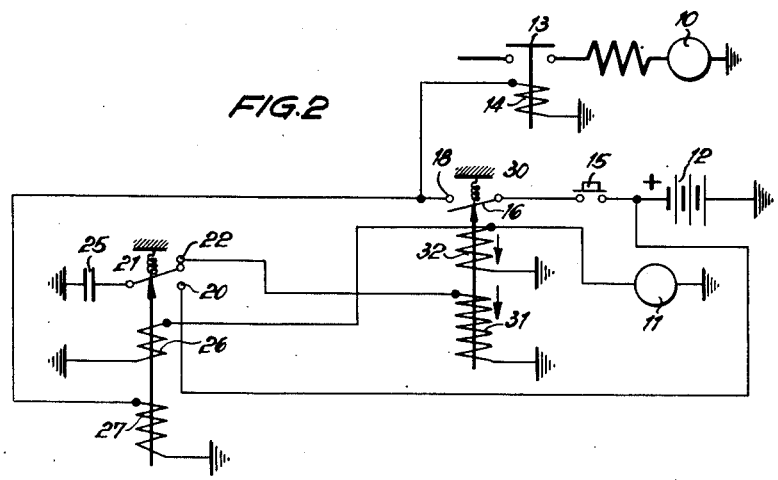

In the drawings:

Fig. 1 shows the circuit diagram of one form of starting device for an internal combustion engine, and Fig. 2 the circuit diagram of a second form of construction.

In the circuit diagram as shown in Fig. 1, 10 is a starting motor, 11 a generator (dynamo) driven by the internal combustion engine, 12 a battery and 13 an electro-magnetic starting switch with an exciter winding 14. From these parts of the installation one pole each is connected to earth.

From the positive pole of the battery, a lead passes through a press button switch 15 to the switching arm 16 of a control relay 17 with working contacts, that is to say a relay the contacts of which close upon excitation. The stationary switch contact 18 of the relay is connected with the exciter winding 14 of the starting switch.

The exciter winding 19 of the relay is disposed between the switching arm 16 and the generator 11. In addition, from the positive pole of the battery a lead passes to the starting switch 13 and to the stationary contact 20 of a change-over switch 21. The latter has also a second stationary contact 22 to which one end of an additional winding 23, working opposed to the exciter winding 19 mounted on the relay 17, is connected, the other end of which is earthed. The switch member 24 of the change-over switch is connected with one pole of a condenser 25 whose other pole is also earthed. The change-over switch has two windings 26 and 27 earthed on the one hand, the first of which, on the other hand, is connected to the generator, the latter to the contact 18 of the relay 17. The control device works as follows:

When the internal combustion engine is not running and the generator 11 driven thereby is likewise at rest, the starting switch 13 and the relay 17 are open, before the actuation of the press-button 15, and the switch arm 24 of the change-over switch 21 is disposed on the contact 22 (position as illustrated). For starting the internal combustion engine, the press-button switch 15 is closed. Current now flows from the battery through the exciter winding 17 and the non-working generator 11 and it excites and closes the relay and thus the starting switch 13, whereby the starting motor is connected to the battery and starts the internal combustion engine. At the same time current flows also from the contact 18 of the relay 17 through the winding 27 of the change-over switch and causes the change over to contact 20, whereby the condenser is coupled with the battery. With increasing number of revolutions of the internal combustion engine and of the generator, the voltage of the generator opposed to the battery voltage increases and renders the winding 19 inoperative so that the relay opens. The change-over switch 21 of the condenser is kept in its position on contact 20 by the current flowing through the winding 26 coming from the generator. As long as the generator is being driven by the internal combustion engine with sufficient speed, the control relay 17, therefore, remains open; the starting switch 13, therefore, cannot become effective.

When the internal combustion engine is running down after being switched off, the voltage in the generator quickly drops to such a low voltage that the latter is no longer able to hold the change-over switch and the latter changes over to the contact 22. Now the condenser 25 can discharge through the winding 23 of the control relay 17 which acts against the winding 19.

If the press-button 15 is depressed before the internal combustion engine has come to a standstill, no damage can occur because the winding 23 weakens the field of the winding 19, now excited by the current from the battery, to such an extent that the relay does not come into action. If the press-button 15 is not depressed, the winding 19 remains without any current at all, whilst the winding 23 is energised by the current from the condenser. The thus produced field is kept so small by suitable proportioning of the condenser and the winding 23 that it alone cannot actuate the relay. The field produced by the condenser current in the winding 23 causes the time after which the relay may be connected again, to be extended. It is advisable for the condenser and the winding 23 to be so proportioned that the delaying action lasts about 2 to 3 seconds, which time is generally sufficient for the oscillations of the internal combustion engines in all cases to stop completely.

The form of construction shown in Fig. 2 differs only from the example shown in Fig. 1 by the feature that, instead of the relay 17 with working contacts, a relay 13 with closed circuit contacts is used. This means that the relay opens when it is excited. In this case the additional winding 31 of the control relay fed from the condenser 25 is so arranged that it supports the winding 32 of the relay in its action. When operating the internal combustion engine the control relay 30 is kept open by the voltage of the working generator. When the engine runs down, the voltage of the generator drops first to a value at which the control relay is still kept open, the change-over switch, on the other hand, changes over to its position of rest on the contact 22. The condenser 25 charged previously by the battery now discharges through the winding 31 of the control relay, supports the action of the winding 32 and keeps the control relay open until the condenser has discharged. As the size of the condenser is so chosen and the winding 31 is so proportioned that the discharge lasts again approximately 2 to 3 seconds, this time is sufficient for the running down of the internal combustion engine until it comes completely to rest.

I claim:

1. An electrical starting arrangement for internal combustion engines, including in combination an electrical storage battery, an electrical generator driven by the internal combustion engine, a starting motor, an electro-magnetic starting switch therefor, a control relay for the starting switch, a hand operated switch controlling the circuits of these elements, an additional winding on the control relay, and an electrical condenser discharged through said additional winding when the internal combustion engine is switched off whereby the relay remains open until the internal combustion engine comes completely to rest.

2. An electrical starting arrangement for internal combustion engines, including in combination an electrical storage battery, an electrical generator driven by the internal combustion engine, a starting motor, an electro-magnetic starting switch therefor, a control relay for the starting switch, a hand operated switch controlling the circuits of these elements, an additional winding on the control relay, an electrical condenser discharged through said additional winding when the internal combustion engine is switched off whereby the relay remains open until the internal combustion engine comes completely to rest, and means to change over the connection of said condenser from connection to the said additional winding to connection with the battery.

3. An electrical starting arrangement for internal combustion engines, including in combination an electrical storage battery, an electrical generator driven by the internal combustion engine, a starting motor, an electro-magnetic starting switch therefor, a control relay for the starting switch, a hand operated switch controlling the circuits of these elements, an additional winding on the control relay, an electrical condenser discharged through said additional winding when the internal combustion engine is switched off whereby the relay remains open until the internal combustion engine comes completely to rest, and an electro-magnetic change-over switch to change over the connection of said condenser from connection to the said additional winding to connection with the battery.

4. An electrical starting arrangement for internal combustion engines, including in combination an electrical storage battery, an electrical generator driven by the internal combustion engine, a starting motor, an electro-magnetic starting switch therefor, a control relay for the starting switch, a hand operated switch controlling the circuits of these elements, an additional winding on the control relay, an electrical condenser discharged through said additional winding when the internal combustion engine is switched off whereby the relay remains open until the internal combustion engine comes completely to rest, and an electro-magnetic change-over switch to change over the connection of said condenser from connection to the said additional winding to connection with the battery, said electro-magnetic change-over switch including an electro-magnetic winding operated by the control relay and a holding winding fed by said generator.

5. An electrical starting arrangement for internal combustion engines, including in combination an electrical storage battery, an electrical generator driven by the internal combustion engine, a starting motor, an electro-magnetic starting switch therefor, a control relay for the starting switch, a hand operated switch controlling the circuits of these elements, an additional winding on the control relay, and an electrical condenser discharged through said additional winding when the internal combustion engine is switched off whereby the relay remains open until the internal combustion engine comes completely to rest, said additional winding acting in opposition to the electro-magnetic winding of the control relay.

6. An electrical starting arrangement for internal combustion engines, including in combination an electrical storage battery, an electrical generator driven by the internal combustion engine, a starting motor, an electro-magnetic starting switch therefor, a control relay for the starting switch, a hand operated switch controlling the circuits of these elements, an additional winding on the control relay, an electrical condenser discharged through said additional winding when the internal combustion engine is switched off, said additional winding acting in oppositon to the electro-magnetc winding of the control relay, and an electro-magnetic change-over switch including an electro-magnetic winding operated by the control relay and a holding winding fed by said generator, which change over switch changes the connection of said condenser from connection to the said additional winding to connection with the battery.

UNITED STATES PATENTS

References Cited in the file of this patent

| | | |
|---|---|---|
| 1,845,767 | Stecher | Feb. 16, 1932 |
| 1,875,192 | Middleton | Aug. 30, 1932 |
| 1,993,070 | Middleton | Mar. 5, 1935 |
| 2,007,058 | Maurer | July 2, 1935 |
| 2,033,364 | Wertz | Mar. 10, 1935 |
| 2,071,028 | Douglas | Feb. 16, 1937 |
| 2,338,460 | Schmitt | Jan. 4, 1944 |